US 9,802,259 B2

(12) United States Patent
Oettle et al.

(10) Patent No.: US 9,802,259 B2
(45) Date of Patent: Oct. 31, 2017

(54) TOOL SYSTEM FOR MACHINING A WORKPIECE

(71) Applicant: Hartmetall-Werkzeugfabrik Paul Horn GmbH, Tübingen (DE)

(72) Inventors: Matthias Oettle, Wellendingen (DE); Sebastian Schetter, Tübingen (DE)

(73) Assignee: HARTMETALL-WERKZEUGFABRIK PAUL HORN GMBH, Tuebingen (DE)

( * ) Notice: Subject to any disclaimer, the term of this patent is extended or adjusted under 35 U.S.C. 154(b) by 718 days.

(21) Appl. No.: 14/248,512

(22) Filed: Apr. 9, 2014

(65) Prior Publication Data

US 2014/0227047 A1 Aug. 14, 2014

Related U.S. Application Data

(63) Continuation of application No. PCT/EP2012/070038, filed on Oct. 10, 2012.

(30) Foreign Application Priority Data

Oct. 10, 2011 (DE) .................. 10 2011 116 080

(51) Int. Cl.
*B23C 5/00* (2006.01)
*B23B 31/02* (2006.01)
(Continued)

(52) U.S. Cl.
CPC ............ *B23C 5/006* (2013.01); *B23B 29/046* (2013.01); *B23B 31/02* (2013.01); *B23B 31/117* (2013.01);
(Continued)

(58) Field of Classification Search
CPC .............. B23B 2240/21; B23B 29/046; B23C 2240/08; B23C 2240/21; B23C 5/26
See application file for complete search history.

(56) References Cited

U.S. PATENT DOCUMENTS 3,879,302 A * 4/1975 Reick .................. C09K 3/1009
252/363.5
4,796,923 A * 1/1989 Liggins ................ F16L 15/004
285/148.19
(Continued)

FOREIGN PATENT DOCUMENTS

DE 4334259 4/1994
DE 10326928 A1 1/2005
(Continued)

OTHER PUBLICATIONS

Examination Report for corresponding Chinese Patent Application No. 201280049631.1, mailed Jun. 3, 2015.
(Continued)

*Primary Examiner* — Sara Addisu
(74) *Attorney, Agent, or Firm* — Jason H. Vick; Sheridan Ross, PC

(57) ABSTRACT

A tool system for machining a workpiece is provided having a cylinder-shaped retaining shank that has a cutting head holder on an end surface facing the workpiece, a drive mount on an end surface facing the drive, a cutting head having at least one cutting edge, a cutting head hub corresponding to the cutting head holder on the retaining shank, a tool coupling with a tool interface, and a coupling hub corresponding to the drive mount. The coupling hub or the cutting head hub have elevated areas, with contact surfaces, distributed in circumferential and longitudinal directions of the coupling hub or the cutting head hub. The contact surfaces make contact on support surfaces on the drive mount or on the cutting head holder on the retaining shank. The drive mount or the cutting head holder is permanently connected to the coupling hub or the cutting head hub by a joining material in intermediate spaces between the elevations.

5 Claims, 3 Drawing Sheets

(51) Int. Cl.
*B23B 31/117* (2006.01)
*B23C 5/26* (2006.01)
*B23D 77/00* (2006.01)
*B23B 29/04* (2006.01)

(52) U.S. Cl.
CPC ............... *B23C 5/26* (2013.01); *B23D 77/00* (2013.01); *B23B 2226/27* (2013.01); *B23B 2226/275* (2013.01); *B23B 2240/08* (2013.01); *B23B 2240/21* (2013.01); *B23C 2226/27* (2013.01); *B23C 2240/08* (2013.01); *B23C 2240/21* (2013.01); *Y10T 407/1906* (2015.01)

(56) References Cited

U.S. PATENT DOCUMENTS

| | | | |
|---|---|---|---|
| 5,048,375 A | | 9/1991 | Kobayashi |
| 5,114,286 A * | | 5/1992 | Calkins ............... B23B 31/11 408/226 |
| 5,292,213 A | | 3/1994 | Massa et al. |
| 5,971,670 A * | | 10/1999 | Pantzar ............... B23B 31/1107 407/119 |
| 6,966,393 B2 * | | 11/2005 | Brady ............... E21B 17/03 175/324 |
| 7,325,471 B2 * | | 2/2008 | Massa ............... B23B 27/12 279/8 |
| 7,713,004 B2 * | | 5/2010 | Lehto ............... B23B 31/005 407/30 |
| 8,534,963 B2 * | | 9/2013 | Luik ............... B23C 3/28 279/83 |
| 8,668,413 B2 * | | 3/2014 | Volokh ............... B23B 31/113 279/93 |
| 8,956,091 B2 * | | 2/2015 | Nonaka ............... B23B 31/11 408/233 |
| 9,108,251 B2 * | | 8/2015 | Craig ............... B23B 51/00 |
| 9,505,059 B2 * | | 11/2016 | Chen ............... B23B 29/046 |
| 2002/0009342 A1 * | | 1/2002 | Vasudeva ............... B23B 31/005 408/226 |
| 2002/0021945 A1 * | | 2/2002 | Harpaz ............... B23B 31/11 407/53 |
| 2003/0210963 A1 * | | 11/2003 | Kakai ............... B23B 31/008 408/231 |
| 2006/0073744 A1 * | | 4/2006 | Jonsson ............... B23B 31/11 439/884 |
| 2006/0140736 A1 | | 6/2006 | Kress et al. |
| 2010/0143051 A1 * | | 6/2010 | Lutfi ............... B23C 5/1018 407/11 |
| 2011/0008114 A1 * | | 1/2011 | Wang ............... B23B 29/24 407/44 |
| 2011/0266756 A1 | | 11/2011 | Haimer |
| 2014/0202293 A1 * | | 7/2014 | Van Handel ....... B23Q 11/0032 82/1.11 |
| 2015/0231708 A1 * | | 8/2015 | McCormick ............ B23B 31/08 279/143 |

FOREIGN PATENT DOCUMENTS

| | | |
|---|---|---|
| DE | 10326928 | 7/2009 |
| JP | 2-47139 U | 3/1990 |
| JP | 03-202217 | 9/1991 |
| JP | 05277865 | 10/1993 |
| WO | WO 2006/046789 | 5/2006 |
| WO | WO 2010/022859 | 3/2010 |

OTHER PUBLICATIONS

Notice of Reasons for Rejection (Including Translation) for corresponding Japanese Patent Application No. 2014-535042, mailed Sep. 1, 2015.
International Search Report for corresponding International Application No. PCT/EP2012/070038, dated Jan. 10, 2013.

* cited by examiner

TOOL SYSTEM FOR MACHINING A WORKPIECE

CROSS REFERENCES TO RELATED APPLICATIONS

This application is a continuation of international patent application PCT/EP2012/070038, filed on Oct. 10, 2012 designating the U.S., which international patent application has been published in German language and claims priority from German patent application DE 10 2011 116 080.2, filed on Oct. 10, 2011. The entire contents of these priority applications are incorporated herein by reference.

BACKGROUND OF THE INVENTION

The disclosure relates to a cutting tool system for machining a workpiece and to a cutting head and a tool coupling for such a cutting tool system.

Tool systems of this type are used for the fine machining of cylindrical bores. Such a tool system is described, for example, in DE 103 26 928 B4. This tool system has a holder which is fastened to a flange. Furthermore, an interchangeable head is attached to the workpiece-side end of the holder by means of a chucking device.

In addition to the conventional tool systems made from steel, lightweight constructions made from light metal are also known, in which the cutting edges are fastened to the tool body by means of a joining method or are accommodated on the cutting body by means of steel cartridges.

SUMMARY OF THE INVENTION

It is thus an object to provide an alternative configuration of a cutting tool system for machining a workpiece in terms of a considerable reduction in the tool weight and in the tilting moment, and also to provide an alternative cutting head and an alternative tool coupling of the cutting tool system.

In view of this object, a cutting tool system for machining a workpiece is provided, comprising:
  a cylindrical holding shank which has a cutting head fixture on a workpiece-side end face and a drive fixture on a drive-side end face,
  a cutting head with at least one cutting edge and with a cutting head hub matching with the cutting head fixture of the holding shank, and
  a tool coupling with a tool interface and with a coupling hub matching with the drive fixture,
wherein the cutting head hub comprises elevated regions with bearing faces, the elevated regions being arranged so as to be distributed both in a circumferential direction of the cutting head hub and along the cutting head hub, the bearing faces bearing against supporting faces of the cutting head fixture of the holding shank, wherein the cutting head fixture is firmly connected to the cutting head hub by means of a joining material introduced into interspaces between the elevated regions.

In a further aspect, a cutting tool system for machining a workpiece is presented, comprising:
  a cylindrical holding shank which has a cutting head fixture on a workpiece-side end face and a drive fixture on a drive-side end face,
  a cutting head with at least one cutting edge and with a cutting head hub matching with the cutting head fixture of the holding shank, and
  a tool coupling with a tool interface and with a coupling hub matching with the drive fixture,
wherein the coupling hub comprises elevated regions with bearing faces, the elevated regions being arranged so as to be distributed both in a circumferential direction of the coupling hub and along the coupling hub, the bearing faces bearing against supporting faces of the drive fixture of the holding shank, wherein the cutting head fixture is firmly connected to the cutting head hub by means of a joining material introduced into interspaces between the elevated regions.

In a further aspect, a tool coupling for a cutting tool system for machining a workpiece is presented, the cutting tool system having a cylindrical holding shank which has a drive fixture with supporting faces on a drive-side end face:
  the tool coupling having a coupling hub matching with the drive fixture,
  the coupling hub having elevated regions with bearing faces,
  the elevated regions being arranged so as to be distributed both in a circumferential direction of the coupling hub and along the coupling hub,
  the bearing faces bearing against supporting faces of the drive fixture of the holding shank,
  the drive fixture of the holding shank being firmly connected to the coupling hub of the tool coupling by means of a joining material introduced into interspaces between the elevated regions.

In a further aspect, a cutting head for a cutting tool system for machining a workpiece is presented, the cutting tool system having a cylindrical holding shank which has a cutting head fixture with supporting faces on a workpiece-side end face:
  the cutting head having at least one cutting edge,
  the cutting head having a cutting head hub matching with the cutting head fixture,
  the cutting head hub having elevated regions with bearing faces,
  the elevated regions being arranged so as to be distributed both in a circumferential direction of the cutting head hub and along the cutting head hub,
  the bearing faces bearing against supporting faces of the cutting head fixture of the holding shank,
  the cutting head fixture being firmly connected to the cutting head hub by means of a joining material introduced into interspaces between the elevated regions.

Contrary to the tool systems known from the prior art, the tool system according to the disclosure has a cylindrical holding shank, a cutting head and a tool coupling which are firmly connectable to one another. In this respect, by suitable choice of material for the cylindrical holding shank, a considerable reduction in the tool system weight and also in the tilting moment can be achieved. A high precisioning accuracy of the cutting head in relation to the tool coupling can thereby be ensured even for long projecting lengths of the tool system.

Furthermore, by the tilting moment of the tool system being reduced, a higher degree of precision for the drillhole can be achieved, this being related to the accompanying reduction in the unbalance of the tool system.

According to a preferred refinement, at least one elevated region is formed continuously in the circumferential direction along the coupling hub and/or the cutting head hub.

This simple form of the refinement affords a highly cost-effective and simple possibility of implementing these elevated regions on the coupling hub and/or the cutting head hub. One of the very simplest embodiments is a simple thread which has basically any desired flight spacing and which is cut into the coupling hub and/or the cutting head hub.

According to a further refinement at least two elevated regions are formed continuously in the circumferential direction of the coupling hub and/or of the cutting head hub, the at least first elevated region being arranged so as to be spaced apart in relation to the at least last elevated region along the coupling hub and/or the cutting head hub.

This arrangement of the elevated regions ensures a reliable and accurate reception of the coupling hub and/or of the cutting head hub into the matching drive fixture and/or cutting head fixture of the holding shank. Tilting of the hubs in relation to the fixture of the holding shank is prevented due to the radially continuous arrangement of the elevated regions and to the axial spacing of the elevated regions. Furthermore, the size of the interspace and consequently the size of the desired joining area between the coupling hub and/or cutting head hub and the drive fixture and/or cutting head fixture can be defined by the spacing of the elevated regions along the coupling hub and/or cutting head hub.

According to a further refinement, three elevated regions are formed continuously in the circumferential direction of the coupling hub and/or of the cutting head hub, at least one middle elevated region, arranged along the coupling hub and/or cutting head hub between the first elevated region and the last elevated region, having at least one region of lower height.

This arrangement of the elevated regions affords a high degree of accuracy in the orientation of the coupling hub and/or cutting head hub in relation to the drive fixture and/or cutting head fixture of the holding shank. Furthermore, the region of lower height on the middle of the two elevated regions ensures a possible throughflow for the joining material introduced into the interspaces, this leading to a uniform distribution of the joining material in the interspaces and consequently to a pronounced joining area between the coupling hub and/or cutting head hub and the drive fixture and/or cutting head fixture.

According to a further refinement, the first elevated region and the last elevated region are preferably contiguous respectively to the workpiece-side end and to the drive-side end of the coupling hub and/or cutting head hub.

This arrangement of the elevated region affords the advantage that the interspaces are closed off outwardly by the elevated regions. Consequently, an escape of the joining material introduced into the interspaces is therefore also prevented by the elevated regions.

According to a further refinement, the elevated regions are of ring-shaped design.

This ring-shaped configuration offers a very simply implementable and cost-effective possibility of providing the elevated regions on the coupling hub and/or cutting head hub at low outlay.

According to a further refinement, the elevated regions are formed continuously along the coupling hub and/or the drive hub, these elevated regions, in particular at least four webs running along the coupling hub and/or the application, being spaced apart in the circumferential direction of the coupling hub and/or application by interspaces.

A configuration of at least four webs running along the coupling hub and/or cutting head hub ensures an accurate orientation of the cutting head hub and/or coupling hub in relation to the drive fixture and/or cutting head fixture of the holding shank.

In addition to the already discussed embodiments of the elevations regions, this refinement also offers the possibility of adapting the connection matching the coupling hub and/or drive hub and the drive fixture and/or cutting head fixture of the holding shank in each case according to the given requirements for the tool system.

According to a further refinement, the tool system has a coolant pipe capable of being introduced into the holding shank and running along the holding shank, the coolant pipe having at least one workpiece-side junction end, which is connectable to a first junction element arranged on a drive-side end face of the cutting head, and having at least one drive-side junction end, which is connectable to a second junction element arranged on a workpiece-side end face of the tool coupling. The coolant pipe is preferably glued or pressed together with the junction elements of the cutting head and the tool coupling respectively.

This form of connection affords a simple, leaktight and cost-effective variant for connecting the junction elements of the cutting head and of the tool coupling to the junction ends of the coolant pipe. The routing of the coolant pipe inside the holding shank and the configuration of the connection between the junction ends of the coolant pipe and the junction elements of the tool coupling and cutting head ensure, in principle, that the length of the coolant pipe is adapted to the length of the holding shank.

According to a further refinement, the holding shank is produced from a composite material, in particular carbon fiber reinforced plastic (CFRP) or glass fiber reinforced plastic (GFRP), or from a light metal or a light metal alloy, in particular aluminum, magnesium or titanium. The requirements for the materials capable of being used for the holding shank arise directly from the requirements for the overall tool system. The material used for the holding shank must therefore have high rigidity and low thermal expansion. Furthermore, the material used must have a strength comparable to steel, at a considerably lower weight, thus leading, for example, to the choice of materials or material combinations mentioned. It will be appreciated that the choice of materials for the holding shank, the configuration of the tool coupling and/or of the cutting head and their connection to the shank are governed by the requirements of the tool system and therefore by the desired sector of use.

It would be appreciated that the features mentioned above and those yet to be explained below can be used not only in the combination specified in each case, but also in other combinations or alone, without departing from the scope of the present disclosure.

DESCRIPTION OF PREFERRED EMBODIMENTS

Figure 1:
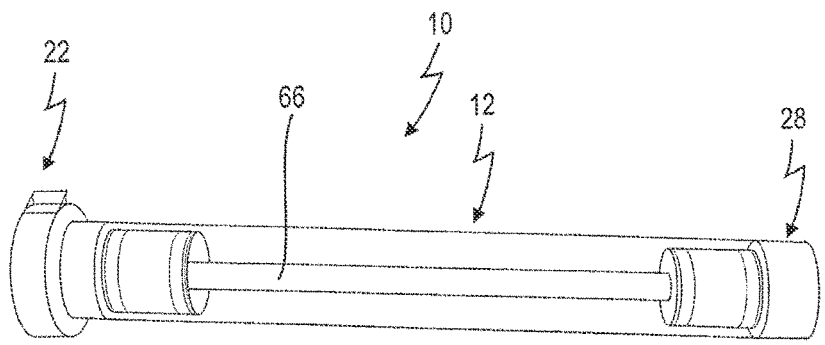
FIG. 1 shows a perspective illustration of a first exemplary embodiment of the tool system in an overview.

FIG. 1 shows a perspective illustration of a first embodiment of a tool system 10 according to the disclosure comprising a holding shank 12, a cutting head 22, a tool coupling 28 and a coolant pipe 66. In this embodiment, the cutting head 22, tool coupling 28 and coolant pipe 66 are composed of steel, whereas the holding shank 12 is made from a composite material, in particular CFRP or GFRP.

The holding shank 12 has a cutting head fixture 16 on a workpiece-side end face 14 and a drive fixture 20 on a drive-side end face 18. Located on the tool system 10 on the workpiece side is a cutting head 22 with at least one cutting edge 24 and with a cutting head hub 26 matching with the cutting head fixture 16 of the holding shank 12 and which is introduced into the cutting head fixture 16. Located on the tool system 10 on the drive side is a tool coupling 28 with a tool interface 30 and with a coupling hub 32 matching with the drive fixture 20 and which is introduced into the drive fixture 20.

Figure 2:
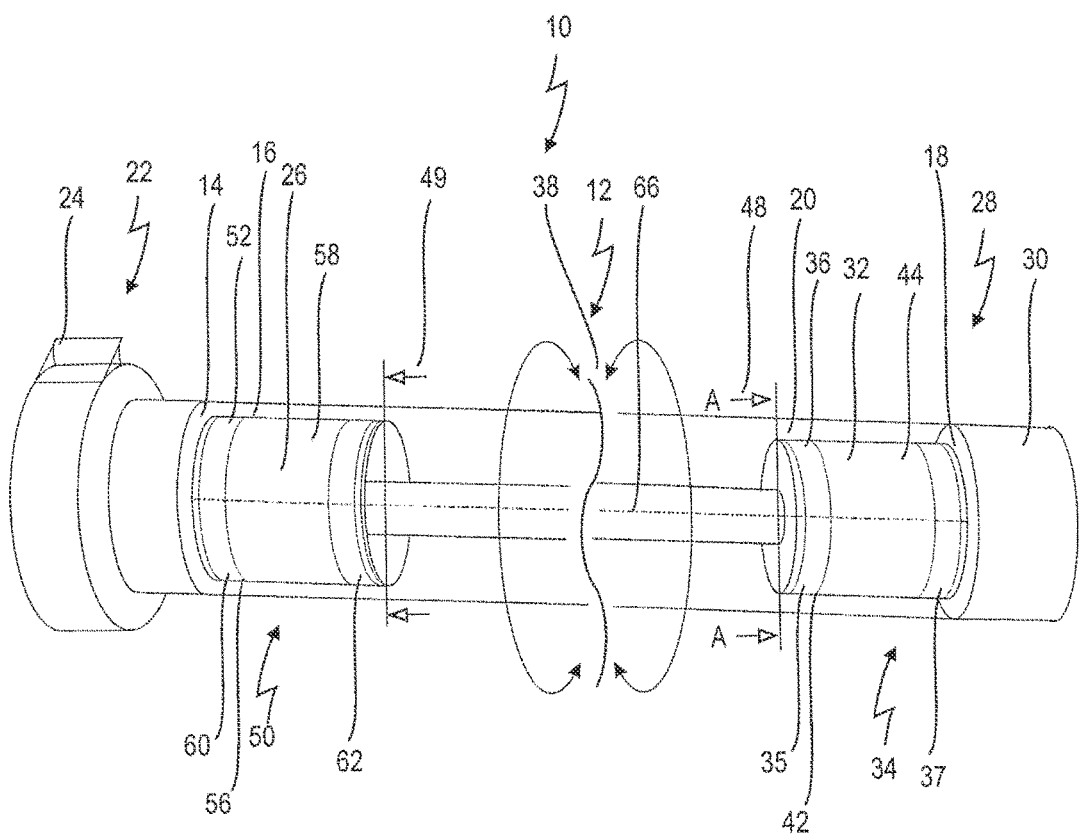
FIG. 2 shows a perspective illustration of the first embodiment with a detailed illustration of the two ends of the tool system.
Figure 3:
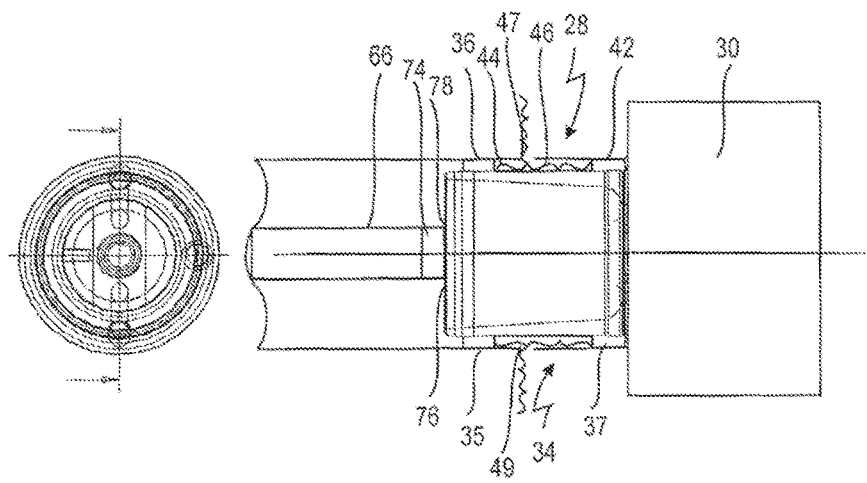
FIG. 3 shows a front view and a sectional illustration of an embodiment of the tool coupling.

The coupling hub 32 has elevated regions 34 with bearing faces 36, the elevated regions 34 being configured, as illustrated in FIGS. 1 to 3, by circular rings formed along the circumferential direction 38 and along the coupling hub 32. Furthermore, these rings are arranged so as to be distributed along the coupling hub 32, the bearing faces 36 bearing against the supporting faces 42 of the drive fixture 20 of the holding shank. The result of this is that the coupling hub 32 and therefore the tool coupling 28 are oriented so as to be centered along the holding shank 12.

After the tool coupling 28 is oriented in relation to the holding shank 12, the interspaces 44 between the elevated regions 34 on the coupling hub 32 are filled by means of a joining material 46, the joining material being introduced through a filling orifice 47 and remerging through an outlet orifice 49. If possible, the interspaces 44 are filled completely with the joining material 46. The joining material 46 thus makes a firm connection between the coupling hub 32 and the drive fixture 20 and consequently a firm connection between the tool coupling 28 and the holding shank 12.

In this preferred embodiment, illustrated in FIGS. 1 to 3, FIG. 4b and FIG. 5, the arrangement of a first elevated region 25 and of a last elevated region 37 at the drive-side end 47 and at the workpiece-side end 43 of the coupling hub 32 prevents the situation where the joining material 46 introduced into the interspaces 44 leaves the interspaces 44 and they escape outwardly into the holding shank 12 and/or out of the holding shank 12. This arrangement of the elevated regions 34, in conjunction with the filling orifice 47 and outlet orifice 49, thus ensures uniform filling of the interspaces 44 by means of the joining material 46.

Figures 4A, 4B:
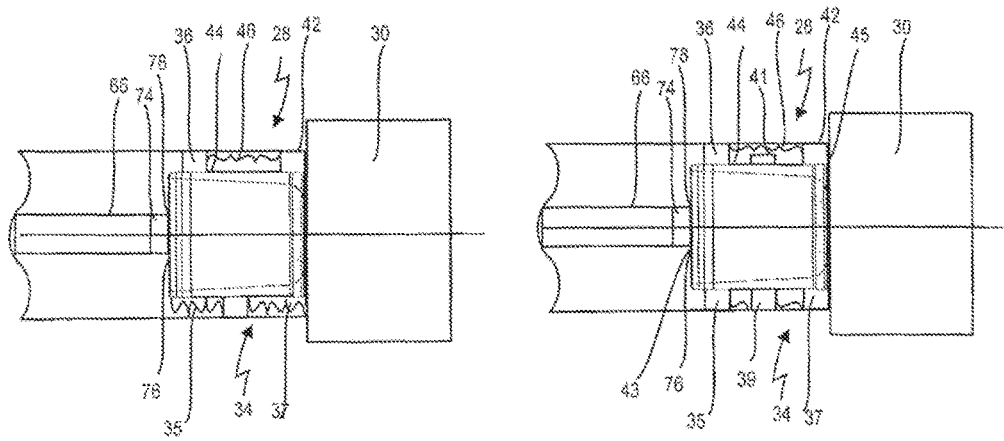
FIGS. 4A-4C show in each case a sectional illustration of two different embodiments of the tool coupling and a further embodiment of the tool coupling in a front view and a sectional illustration.

A further preferred embodiment, which is illustrated in FIG. 4a, has a spiral arrangement of the elevated regions 34, the elevated regions 34 extending along the coupling hub 32.

A further preferred embodiment illustrated in FIG. 4b has the arrangement of three elevated regions. In accordance with FIG. 3, a first elevated region 36 is located at the workpiece-side end 43 of the coupling hub 32 and a second elevated region 37 is located at the drive-side end 45 of said coupling hub. Between the two elevated regions 35, 37 is located a middle elevated region 39 which has, at least in a region 41, a lower height. This region 41 of lower height is necessary for the throughflow of the joining material 46, in order to ensure that the joining material makes a connection between the coupling hub 32 and drive fixture 20 over a large area. Furthermore, by the first elevated region 35 being arranged in relation to the last elevated region 37, the outlet of the joining material 46 from the interspace 44 is prevented.

Figure 4C:
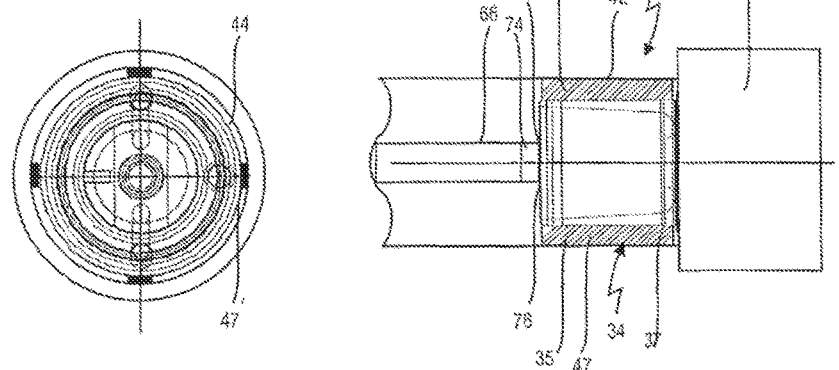

FIG. 4c illustrates a further preferred embodiment in which the elevated regions 34 are formed continuously along the coupling hub 32. These are preferably designed in the form of at least four webs 47 running along the coupling hub 32 and lying diametrically opposite one another. The interspaces 44 required for filling with the joining material 46 are obtained in the radial direction between the at least four elevated regions 34.

Figure 5:
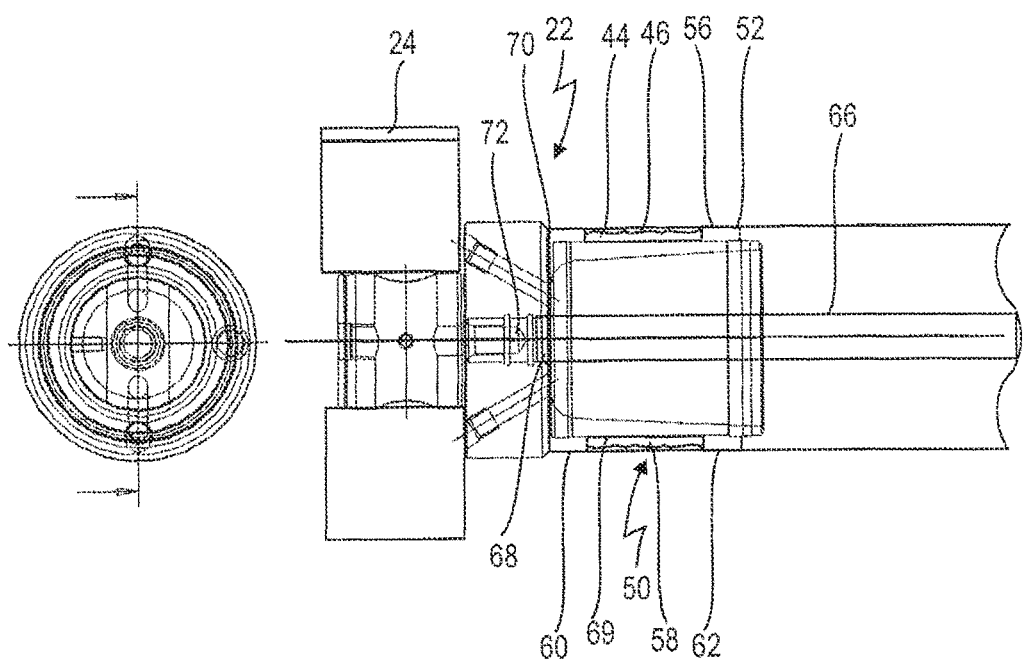
FIG. 5 shows in each case a front view and a sectional illustration of an embodiment of the cutting head.

A workpiece-side part of the holding shank 12 is depicted in FIG. 5. Located at the workpiece-side end of the holding shank 12 is an end face 14 with a cutting head fixture 16 which runs in the holding shank 12 and which receives the cutting head hub 26 matching with the cutting head fixture 16. The cutting head 22 has at least one cutting edge 24 in the circumferential direction 38, preferably a plurality of cutting edges 24 attached symmetrically to the cutting head 22 being used. The cutting head hub 26 has elevated regions 50 with bearing faces 52, the elevated regions 50 being designed in the form of rings extending continuously in the circumferential direction 38 and stretched out along the cutting head hub 26.

Introducing the cutting head hub 26 into the cutting head fixture 16 of the holding shank 12 causes the bearing faces 52 of the elevated regions 50 to come to bear firmly against the supporting faces 56 of the cutting head fixture 16. The connection between the bearing faces 52 and the supporting faces 56 ensures that the cutting head hub 26 is oriented so as to be centered in relation to the holding shank 12.

In accordance with FIGS. 1 to 4, the interspaces 58 formed between the elevated regions 50 are filled with a joining material 46 introduced into the interspaces 58. The joining material thereby makes a firm connection between the cutting head hub 26 and the cutting head fixture 16 and therefore between the cutting head 22 and the holding shank 12.

In accordance with the descriptions relating to FIGS. 4a to c, it is assumed that the cutting head hub 26 has embodiments of the elevated regions 50 in the form of a spiral configuration of the elevated regions 50 and a configuration with a first elevated region 60 and a last elevated region 62 which are located at the workpiece-side end 65 and at the drive-side end 67 of the cutting head 26.

A further embodiment is afforded by an optional middle elevated region 61 which is arranged between the at least first elevated region 60 and the at least last elevated region 62. The middle elevated region 61 likewise has at least one region 63 of lower height. This region 63 ensures a uniform distribution of the joining material 46 in the interspace 44 between the cutting head hub 26 and the cutting head fixture 60.

A further embodiment is afforded in accordance with FIG. 4c, the elevated regions 50 being formed continuously along the cutting head hub 62. These are preferably designed in the form of at least four webs 69 which are present along the cutting head hub 62 and lie diametrically opposite one another. The interspaces 58 required for filling the joining material 46 are obtained in the radial direction between the at least four elevated regions 50.

Furthermore, the tool system 10 illustrated in FIGS. 1 to 5 has a coolant pipe 66 capable of being introduced into the holding shank 12 and running along the holding shank 12. The coolant pipe has a workpiece-side junction end 68 which is connected to a junction element 72 arranged on a drive-side end face 70 of the cutting head. Furthermore, the coolant pipe has a drive-side junction end 74 which is connected to a second junction element 78 arranged on the workpiece-side end face 76 of the tool coupling 28. In a further preferred refinement, the junction ends 68, 74 of the coolant pipe 66 are either glued or pressed together with the junction elements 62, 78.

The connection of the cutting head, tool coupling and holding shank constitutes a simple-to-produce tool system of high precision and very low weight, by means of which, in particular, bores can be machined with high accuracy, even when they have long projecting lengths. Furthermore, the nature of the material of the holding shank and the highly accurate connections to the cutting head and to the tool coupling ensure high precision accuracy and rigidity.

What is claimed is:

1. A cutting tool system for machining a workpiece, comprising:
    a cylindrical holding shank with a workpiece-side end and an opposing drive-side end, wherein a cutting head fixture is arranged on the workpiece-side end, and wherein a drive fixture is arranged on the drive-side end;
    a cutting head with at least one cutting edge and with a cutting head hub matching with the cutting head fixture of the holding shank; and
    a tool coupling with a tool interface and with a coupling hub matching with the drive fixture, the coupling hub extending along a longitudinal direction;
wherein the coupling hub comprises a plurality of radially projecting elevated regions on which bearing faces are provided, wherein the bearing faces bear against corresponding supporting faces of the drive fixture of the holding shank, wherein interspaces are provided between the elevated regions, and wherein the drive fixture is firmly connected to the coupling hub by means of a joining material introduced into the interspaces between the elevated regions, the elevated regions being configured
    (i) as circular rings which are spaced apart from one another in the longitudinal direction of the coupling hub, or
    (ii) as at least four webs which are spaced apart from one another in a circumferential direction of the coupling hub, wherein each of the at least four webs extends along a respective middle axis that runs parallel to the longitudinal direction of the coupling hub.

2. The cutting tool system of claim 1, wherein the cutting head hub comprises a plurality of radially projecting second elevated regions on which second bearing faces are provided, wherein the second bearing faces bear against corresponding supporting faces of the cutting head fixture of the holding shank, wherein second interspaces are provided between the second elevated regions, and wherein the cutting head fixture is firmly connected to the cutting head hub by means of a second joining material introduced into the second interspaces between the second elevated regions.

3. The cutting tool system of claim 2, the second elevated regions being configured
    (i) as rings which are spaced apart from one another in a longitudinal direction of the cutting head hub, or
    (ii) as at least four webs which are spaced apart from one another in a circumferential direction of the cutting head hub, wherein each of the at least four webs extends along a respective middle axis that runs parallel to the longitudinal direction of the cutting head hub.

4. The cutting tool system of claim 1, further comprising a coolant pipe which is introduced into the holding shank and runs along the holding shank, the coolant pipe having at least one workpiece-side junction end, which is connectable to a first junction element arranged on a drive-side end face of the cutting head, and having at least one drive-side junction end, which is connectable to a second junction element arranged on a workpiece-side end face of the tool coupling.

5. The cutting tool system of claim 1, wherein the holding shank is made of a composite material or from a light metal or a light metal alloy.

* * * * *